(12) United States Patent
Chang et al.

(10) Patent No.: US 7,821,588 B2
(45) Date of Patent: Oct. 26, 2010

(54) TFT SUBSTRATE HAVING FIRST AND SECOND PAD SECTIONS FORMED IN PERIPHERAL AREA EACH WITH OVERLAPPING METAL PATTERNS RECEIVING DRIVING SIGNALS TO REPAIR ELECTRICALLY OPENED LINES

(75) Inventors: Jong-Woong Chang, Cheonan-si (KR); Jeong-Il Kim, Seoul (KR); Dong-Gyu Kim, Yongin-si (KR); Yeong-Keun Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 380 days.

(21) Appl. No.: 11/933,274

(22) Filed: Oct. 31, 2007

(65) Prior Publication Data

US 2008/0143944 A1    Jun. 19, 2008

(30) Foreign Application Priority Data

Dec. 13, 2006    (KR) ...................... 10-2006-0127098

(51) Int. Cl.
*G02F 1/1333* (2006.01)
(52) U.S. Cl. .................. 349/54; 349/139; 349/149; 349/151; 349/152; 349/192
(58) Field of Classification Search .................. 349/54, 349/55, 139, 149–152, 192
See application file for complete search history.

(56) References Cited

U.S. PATENT DOCUMENTS 4,752,118 A * 6/1988 Johnson ........................ 349/54
6,872,081 B2 * 3/2005 Imaoka ........................ 439/65

FOREIGN PATENT DOCUMENTS

| KR | 1020030030719 | 4/2003 |
| KR | 100472172 | 2/2005 |
| KR | 1020060065808 | 6/2006 |

* cited by examiner

*Primary Examiner*—John Heyman
(74) *Attorney, Agent, or Firm*—Cantor Colburn LLP

(57) ABSTRACT

A thin film transistor substrate includes a substrate, first and second pad sections, a signal wiring and a pixel array. The first pad section includes first and second lines. The first pad section receives a driving signal through at least one of the first and second lines. The second pad section includes a third line extending from the first line and a fourth line extending from the second line. The second pad section receives the driving signal through at least one of the third and fourth lines. The signal wiring in a display area is electrically connected to at least one of the third and fourth lines to receive the driving signal from the second pad section. The pixel array receives the driving signal from the signal wiring.

24 Claims, 10 Drawing Sheets

100a

TFT SUBSTRATE HAVING FIRST AND SECOND PAD SECTIONS FORMED IN PERIPHERAL AREA EACH WITH OVERLAPPING METAL PATTERNS RECEIVING DRIVING SIGNALS TO REPAIR ELECTRICALLY OPENED LINES

This application claims priority to Korean Patent Application No. 2006-127098, filed on Dec. 13, 2006, and all the benefits accruing therefrom under 35 U.S.C. §119, the contents of which in its entirety are herein incorporated by reference.

BACKGROUND OF THE INVENTION

1. Field of the Invention

The present invention relates to a thin film transistor ("TFT") substrate and a liquid crystal display ("LCD") apparatus having the TFT substrate. More particularly, the present invention relates to a TFT substrate, an LCD apparatus having the TFT substrate capable of repairing a defective portion such as an electrical opening and increasing productivity of the TFT substrate and a method of repairing the TFT substrate.

2. Description of the Related Art

Generally, an LCD apparatus includes a TFT substrate, a color filter substrate facing the TFT substrate and a liquid crystal layer disposed between the TFT substrate and the color filter substrate. The LCD apparatus receives an electric signal from an external signal source such as a printed circuit board ("PCB") to display images by changing the electric signal to control electric fields applied to the liquid crystal layer.

FIG. 1 is a top plan layout view illustrating data lines, gate lines, an out lead bonding ("OLB") pad section and a fan-out section formed on a conventional TFT substrate of the prior art.

Referring to FIG. 1, a conventional TFT substrate of the prior art includes a plurality of gate lines 400 and a plurality of data lines 300 (only a portion of both shown). The data lines 300 extend along a direction that is substantially perpendicular to a longitudinal direction of the gate lines 400, to thereby define a plurality of pixels. Each of the pixels includes a TFT (not shown) and a pixel electrode (not shown). A central area of the TFT substrate, in which the TFTs and the pixel electrodes are formed, corresponds to a display area, and a peripheral area surrounding the display, in which data pads and gate pads are formed, corresponds to a pad area. The data lines 300 and the gate lines 400 extend to the data pads and the gate pads, respectively. The pad area includes a fan-out section 200. The data lines 300 are grouped together, and the data lines 300 of a group move in closer toward each other in the fan-out section 200. The data lines 300 are connected to the OLB pad section 100 to which a tape automation bonded ("TAB") integrated circuit ("IC") is attached. Hereinafter, the fan-out section 200 and the OLB pad section 100 are referred to as a pad section.

FIG. 3 is a schematic diagram illustrating a conventional OLB pad section and wirings of a fan-out section of the prior art.

FIG. 3 illustrates a signal transfer procedure from a driver circuit to a display area. An electrical signal provided from the driver circuit is transferred to the data lines 300 in the display area through the OLB pad section 100 and the fan-out section 200.

A color filter substrate (not shown) combined with the TFT substrate includes a color filter and a common electrode. The color filter substrate is smaller in size than the TFT substrate, such that the pad area, in which the gate pads and the data pads are formed, is exposed when the TFT substrate and the color filter substrate are combined with each other.

When the data lines 300 or the gate lines 400 are electrically opened in the fan-out section 200, a pixel defect or a line defect may be generated in the display area.

According to a conventional LCD apparatus of the prior art, in order to repair a wiring that is electrically opened, a repair wiring may be additionally formed to connect portions of the electrically opened wiring, or the portions of the electrically opened wiring are directly connected to each other.

FIG. 4 is a picture illustrating an electrical open in a conventional fan-out section 200 of the prior art.

Referring to FIG. 4, an electrical open 100a may be generated in the wirings not only in the fan-out section 200 but also in the OLB pad section 100. When the wirings are electrically opened in both the fan-out section 200 and in the OLB pad section 100, the conventional methods cannot be applied to repair the wirings of the fan-out section 200 and the OLB pad section 100. Therefore, a method for repairing electrically opened wiring in a fan-out section or in a OLB pad section is required.

BRIEF SUMMARY OF THE INVENTION

The present invention provides a TFT substrate capable of repairing a defective portion such as an electrical opening and increasing productivity in the manufacture of the TFT substrate.

The present invention also provides an LCD apparatus having the TFT substrate.

The present invention also provides a method of repairing the TFT substrate. In a TFT substrate according to an exemplary embodiment of the present invention, the TFT substrate includes a substrate, a first pad section, a second pad section, a signal wiring and a pixel array. The substrate includes a display area and a peripheral area substantially surrounding the display area. The first pad section is disposed in the peripheral area. The first pad section includes a first line and a second line. The first pad section receives a driving signal through at least one of the first and second lines. The second pad section includes a third line extending from the first line and a fourth line extending from the second line. The second pad section receives the driving signal through at least one of the third and fourth lines. The signal wiring is formed in the display area. The signal wiring is electrically connected to at least one of the third and fourth lines of the second pad section to receive the driving signal from the second pad section. The pixel array is disposed in the display area. The pixel array receives the driving signal from the signal wiring.

The first and second pad sections may respectively include an insulation layer and a conductive pattern. The first and second lines are disposed on the substrate. The insulation layer is disposed on the substrate having the first metal pattern disposed thereon. The third and fourth lines are disposed on the insulation layer. The conductive pattern is disposed on the insulation layer having the second metal pattern disposed thereon. The conductive pattern may be transparent.

The first and second lines may overlap with each other, and the third and fourth lines may overlap with each other.

The third and fourth lines may include a serpentine shape.

The signal wirings may include a plurality of gate lines and a plurality of data lines. The first and third lines may include the same material as that of the gate lines, and the second and fourth lines include the same material as that of the data lines.

The third line, the fourth line and the signal wiring may be electrically connected to one another at an end portion of the second pad section.

Alternatively, the third and fourth lines may be electrically disconnected from each other at an end portion of the second pad section, such that the third line is electrically connected to the signal wiring, when the fourth line is electrically opened. Additionally, the first and second lines may be electrically disconnected from each other at an end portion of the first pad section, such that the first and second lines are electrically connected to each other, when the second line is electrically opened.

In an LCD apparatus according to an exemplary embodiment of the present invention, the LCD apparatus includes a TFT substrate, an opposite substrate and a driver circuit. The TFT substrate includes a substrate, a first pad section, a second pad section, a signal wiring and a pixel array. The substrate includes a display area and a peripheral area substantially surrounding the display area. The first pad section is disposed in the peripheral area. The first pad section includes a first line and a second line. The first pad section receives a driving signal through at least one of the first and second lines. The second pad section includes a third line extended from the first line and a fourth line extended from the second line. The second pad section receives the driving signal through at least one of the third and fourth lines. The signal wiring is disposed in the display area. The signal wiring is electrically connected to at least one of the third and fourth lines of the second pad section to receive the driving signal from the second pad section. The pixel array is disposed in the display area. The pixel array receives the driving signal from the signal wiring. The opposite substrate is combined with the TFT substrate such that the opposite substrate faces the TFT substrate. The driver circuit provides the first pad section of the TFT substrate with the driving signal.

According to an exemplary embodiment of a method of repairing a thin film transistor substrate, the thin film transistor substrate includes a substrate having a display area and a peripheral area substantially surrounding the display area, a first pad section disposed in the peripheral area, the first pad section including a first line and a second line, the first pad section receives a driving signal through at least one of the first and second lines, a second pad section including a third line extending from the first line and a fourth line extending from the second line, the second pad section receives the driving signal through at least one of the third and fourth lines, a signal wiring disposed in the display area, the signal wiring electrically connected to at least one of the third and fourth lines of the second pad section to receive the driving signal from the second pad section and a pixel array disposed in the display area, the pixel array receives the driving signal from the signal wiring. The method includes electrically connecting at least one of the third line, the fourth line and the signal wiring to one another at an end portion, and the first line of the first pad section to the second line of the first pad section to one another at an end portion.

According to the present invention, the OLB pad section corresponding to the first pad section, and the fan-out section corresponding to the second pad section include not only the conventional wirings but also additional wirings, so that even when one of the conventional wirings are electrically opened, the defects may be recovered by the additional wirings.

BRIEF DESCRIPTION OF THE DRAWINGS

The above and other aspects, features and advantages of the present invention will become more apparent by describing in detailed exemplary embodiments thereof with reference to the accompanying drawings, in which.

DETAILED DESCRIPTION OF THE INVENTION

Figure 1:
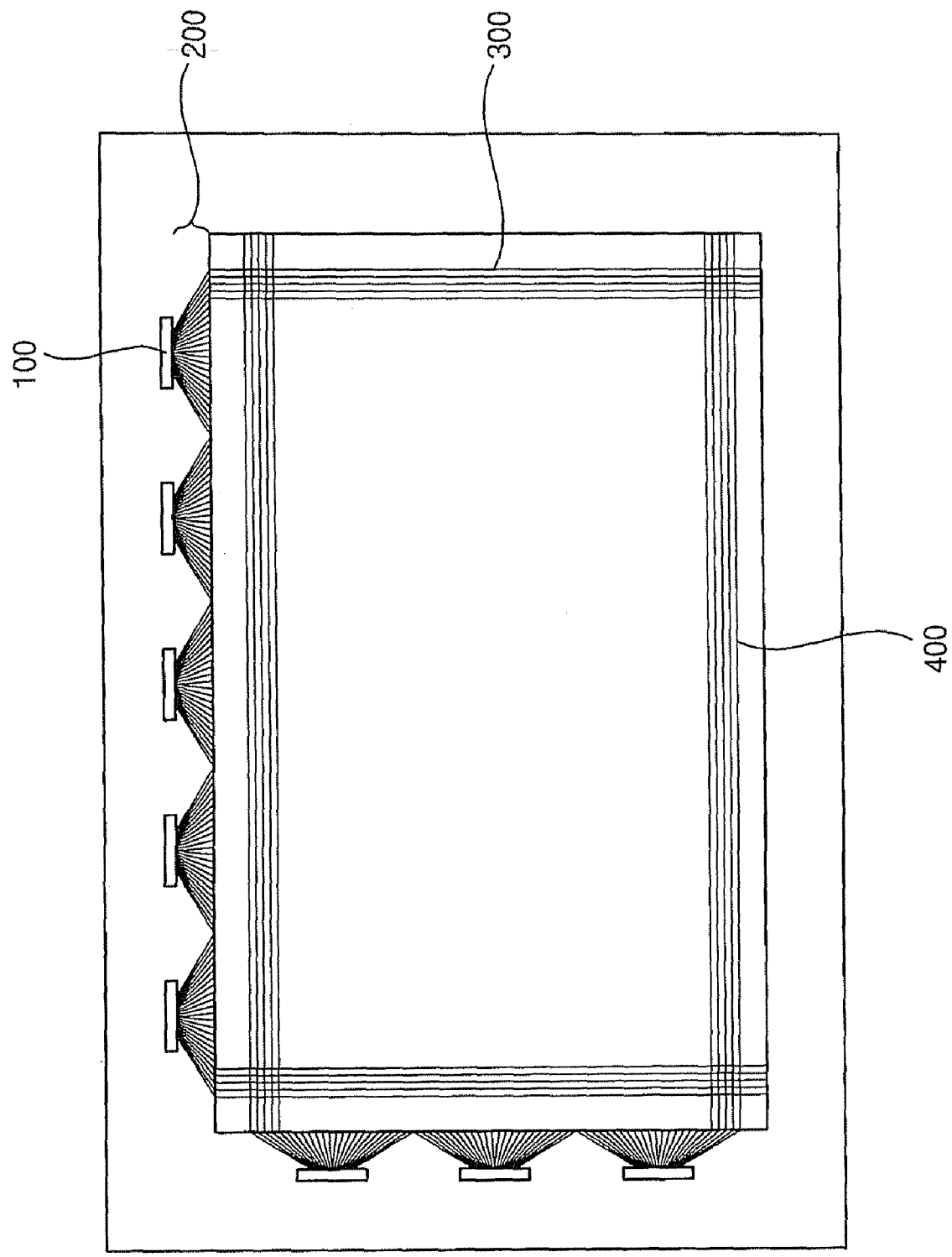
FIG. 1 is a top plan layout view illustrating data lines, gate lines, an out lead bonding ("OLB") pad section and a fan-out section formed on a conventional thin film transistor ("TFT") substrate of the prior art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and areas may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, areas, layers and/or sections, these elements, components, areas, layers and/or sections should not be limited by these terms. These terms are only used to distinguish one element, component, area, layer or section from another area, layer or section. Thus, a first element, component, area, layer or section discussed below could be termed a second element, component, area, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings. A wiring including the same material as that of gate lines in a display area, and manufactured through a process of forming the gate lines will be referred to as "gate metal wiring". A wiring including the same material as that of data lines in a display area, and manufactured through a process of forming the data lines will be referred to as "data metal wiring".

Figure 2A:
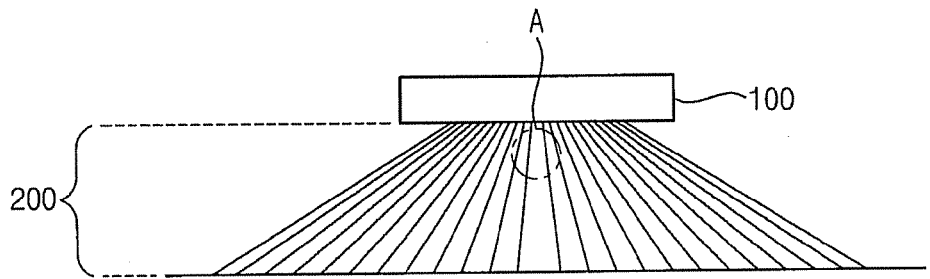
FIG. 2A is an enlarged top plan layout view illustrating a conventional OLB pad section of the prior art in FIG. 1.
Figure 2B:
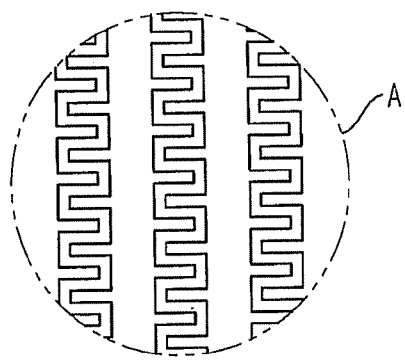
FIG. 2B is an enlarged top plan layout view illustrating a portion 'A' in FIG. 2A.
Figure 3:
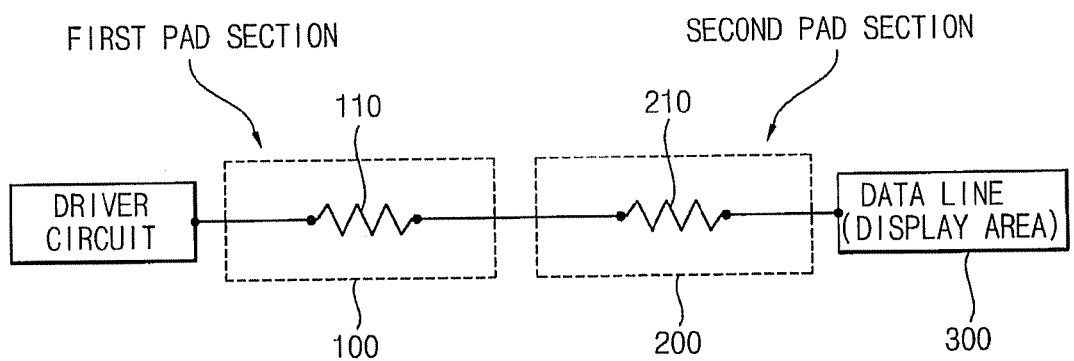
FIG. 3 is a schematic diagram illustrating a conventional OLB pad section and wirings of a fan-out section of the prior art.
Figure 4:
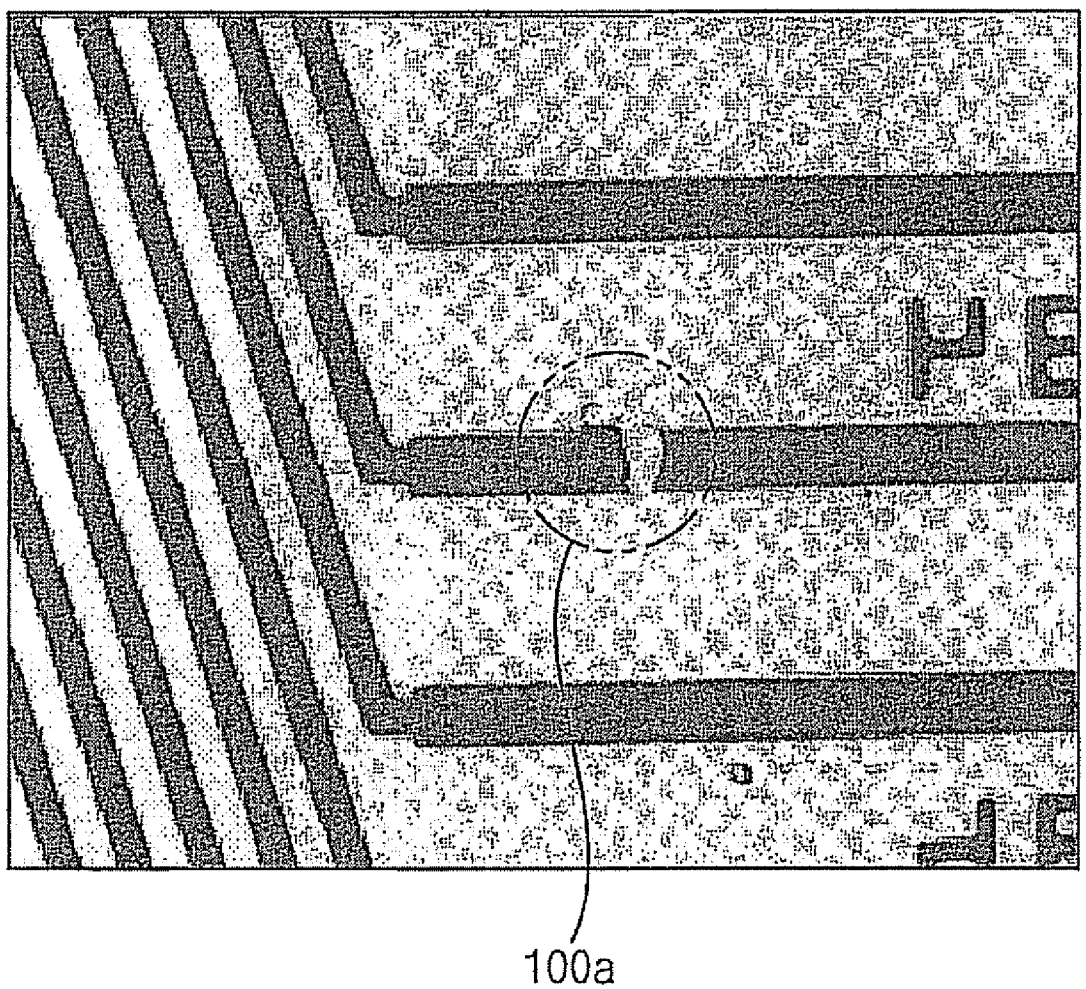
FIG. 4 is a picture illustrating an electrical open in a conventional fan-out section of the prior art.

FIG. 2A is an enlarged top plan layout view illustrating a conventional OLB pad section of the prior art in FIG. 1, and FIG. 2B is an enlarged top plan view illustrating a portion 'A' in FIG. 2A.

Referring to FIGS. 2A and 2B, wirings in the fan-out section 200 have a serpentine-shape, and the wirings are spread apart from each other and extend from the OLB pad section 100. Therefore, a length of the wirings may be different from each other. When the wirings have different lengths from each other, the wirings accordingly have different resistances which induce a signal delay when the wirings transfer signals to the display area. Thus, in order to reduce the signal delay, the above-mentioned serpentine structure may be adopted for the wirings. Alternatively, a width of the wirings may be adjusted in order to compensate for the difference in resistance due to the difference in lengths of the wiring.

Hereinafter, a first exemplary embodiment of the present invention will be described with reference to the figures.

Figure 5:
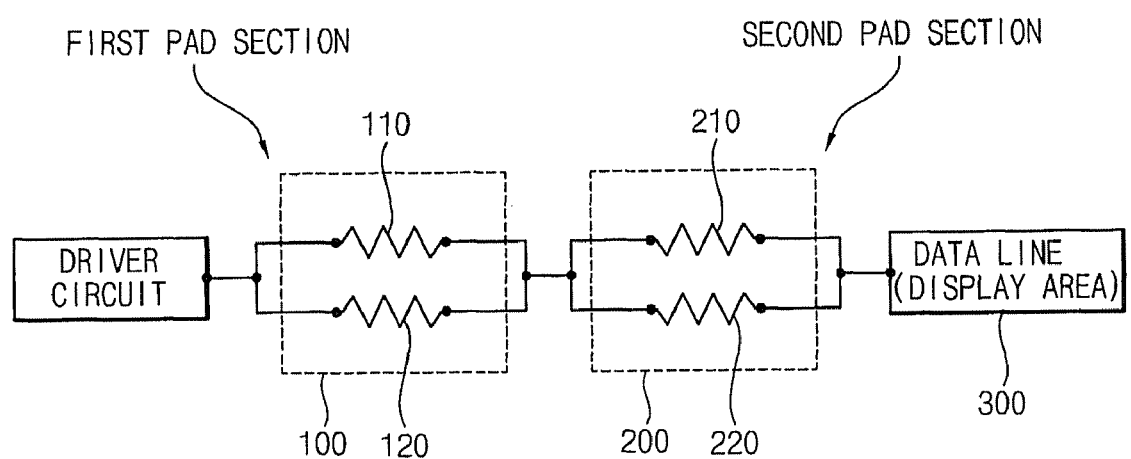
FIG. 5 is a schematic diagram illustrating an exemplary OLB pad section and wirings of a fan-out section according to a first exemplary embodiment of the present invention.

FIG. 5 is a schematic diagram illustrating an exemplary OLB pad section and wirings of a fan-out section according to a first exemplary embodiment of the present invention.

Referring to FIG. 5, a first pad section corresponds to the OLB pad section 100, and a second pad section corresponds to the fan-out section 200. Under a layer on which a data metal wiring 110 of the OLB pad section 100 is formed, a gate metal wiring 120 is formed to overlap with the data metal wiring 110. In exemplary embodiments, the gate metal wiring 120 of the OLB pad section 100 may be formed through a process of manufacturing a gate line for a thin film transistor ("TFT"). Therefore, no additional process is required for manufacturing the gate metal wiring 120. In exemplary embodiments, an insulation layer (not shown) may be formed between gate metal wiring 120 and the data metal wiring 110 of the OLB pad section 100. In an exemplary embodiment, the insulation layer may include silicon nitride ("SiNx"). An indium tin oxide ("ITO") layer (not shown) or an indium zinc oxide ("IZO") layer (not shown) may be formed on the insulation layer. In exemplary embodiments, a portion of the ITO layer or the IZO layer may be removed in the OLB pad section 100 via a patterning process, such that the gate metal wiring 120 may be exposed. More specifically, the gate metal wiring 120 may be formed to be exposed through patterning the insulation layer via a photolithography process using a photoresist film. Therefore, a driving signal generated by a driver circuit may be applied to the gate metal wiring 120 through the exposed portion of the gate metal wiring 120.

When the ITO layer or the IZO layer is formed on the insulation layer, the ITO layer or the IZO layer may make contact with the exposed portion of the gate metal wiring 120, such that the driving signal generated by the driver circuit is applied to the gate metal wiring 120. Therefore, even if the data metal wiring 110 is electrically opened, the driving signal generated by the driver circuit may be applied to the data metal wiring 210 of the fan-out section 200 through the gate metal wiring 120, since the gate metal wiring 120 is electrically connected to the data metal wiring 110 of the OLB pad section 100.

When the gate metal wiring 120 is formed on a substrate, the insulation layer (not shown) is formed on the substrate including the gate metal wiring 120 formed thereon. Then, the data metal wiring 110 is formed on the insulation layer. The gate metal wiring 120 and the data metal wiring 110 are spatially and electrically separated from each other without the ITO layer or the IZO layer disposed therebetween. However, the ITO layer or the IZO layer electrically connects the gate metal wiring 120 and the data metal wiring 110, such that electrical signals may be transferred between the gate metal wiring 120 and the data metal wiring 110.

Figure 6:
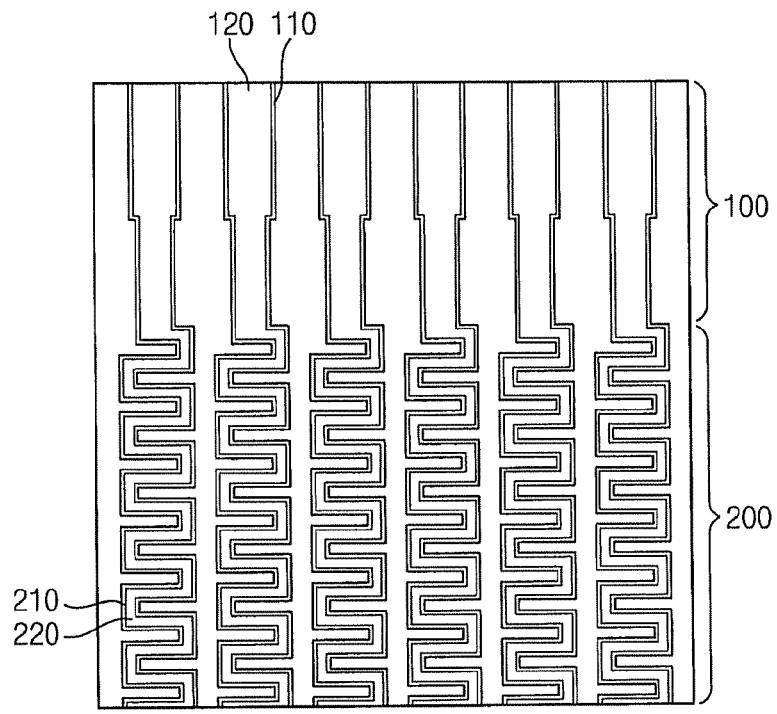
FIG. 6 is an enlarged partial layout view illustrating exemplary wirings in a border area of the OLB pad section and the fan-out section in FIG. 5.
Figure 7:
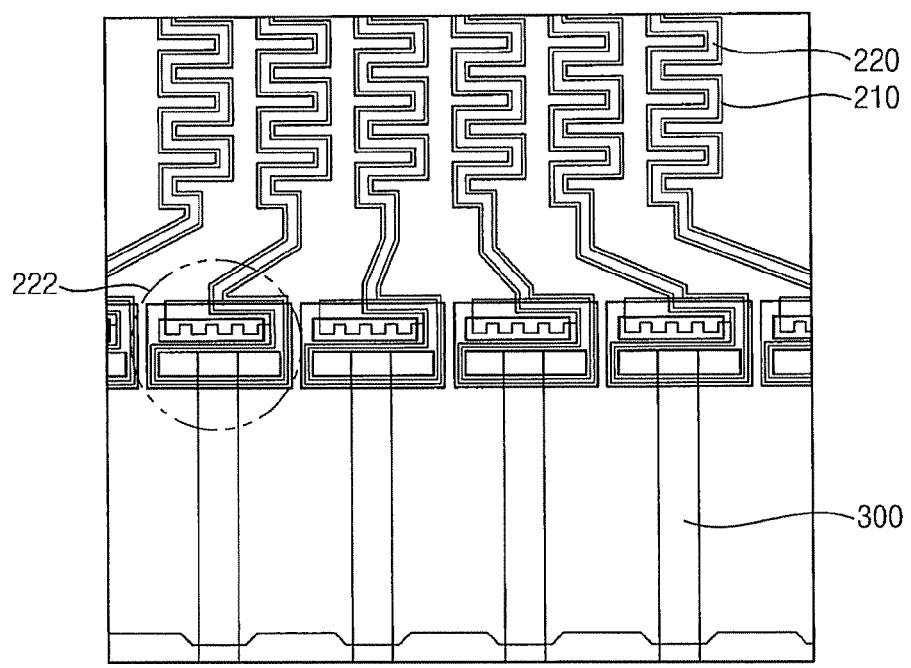
FIG. 7 is an enlarged partial layout view illustrating the exemplary wirings in a border area of the fan-out section in FIG. 5 and a display area.

FIG. 6 is an enlarged partial layout view illustrating wirings in a border area of the OLB pad section 100 and the fan-out section 200 in FIG. 5, and FIG. 7 is an enlarged partial layout view illustrating the wirings in a border area of the fan-out 200 section in FIG. 5 and a display area.

Referring to FIGS. 5 to 7, the gate metal wiring 220 is formed under the data metal wiring 210 such that the gate metal wiring 220 is overlapped with the data metal wiring 210. In exemplary embodiments, the gate metal wiring 220 may be formed through a process of manufacturing a gate line for a TFT. Therefore, no additional process is required for manufacturing the gate metal wiring 220. In exemplary embodiments, an insulation layer (not shown) may be formed between the gate metal wiring 220 and the data metal wiring 210. In an exemplary embodiment, the insulation layer may include silicon nitride ("SiNx"). The gate metal wiring 220 is electrically connected to a data line 300 of the display area at a border area of the fan-out section 200 and the display area. A reference numeral 222 in FIG. 7 illustrates a connection between the gate metal wiring 220 and the data line 300 in the display area. In exemplary embodiments, the gate metal wiring 220 and the data line 300 may be electrically connected to each other through a bridge including ITO or IZO.

Therefore, even if the data metal wiring 210 is electrically opened, the driving signal may still be transferred from the driver circuit to the data line 300 of the display area through the OLB pad section 100 and the gate metal wiring 220, since the data line 300 of the display area is electrically connected to the gate metal wiring 220. The data metal wiring 210 and the gate metal wiring 220 in the fan-out section 200 may be spread apart from an adjacent data metal wiring 210 and gate metal wiring 220 to be electrically connected to data lines 300 in the display area. Therefore, a length of the data metal wiring 210 and the gate metal wiring 220, respectively, may be different from an adjacent data metal wiring 210 and gate metal wiring 220. As a result, a resistance difference for the different lengths of wiring may be generated which induces a signal delay. In order to solve the above problem, the data metal wiring 210 and the gate metal wiring 220 may include a serpentine-shape to reduce the difference in resistance due to the different lengths of wiring. In alternative exemplary embodiments, a width of the data metal wirings 210 and the gate metal wirings 220 may be adjusted such that the width of the data metal wirings 210 and the gate metal wirings 220 increases when a distance between a center of the fan-out section pad section 200 and a position of the data metal wirings 210 and the gate metal wirings 220 increases in order to reduce the difference in resistance, respectively, between the data metal wirings 210 and the gate metal wirings 220.

Hereinafter, a second exemplary embodiment will be described with reference to the figures.

Figure 8:
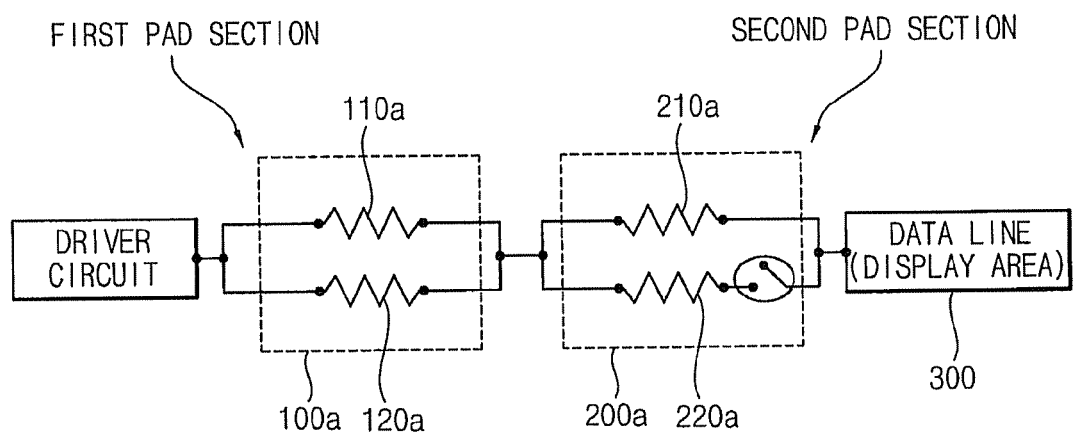
FIG. 8 is a schematic diagram illustrating an exemplary OLB pad section and wirings of a fan-out section according to a second exemplary embodiment of the present invention.

FIG. 8 is a schematic diagram illustrating an exemplary OLB pad section and wirings of a fan-out section according to a second exemplary embodiment of the present invention.

Referring to FIG. 8, the first pad section corresponds to the OLB pad section 100a, and the second pad section corresponds to fan-out section 200a. Under a layer on which a data metal wiring 110a of the OLB pad section 100a is formed, a gate metal wiring 120a is formed to overlap with the data metal wiring 110a. In exemplary embodiments, the gate metal wiring 120a of the OLB pad section 100a may be formed through a process of manufacturing a gate line 400 for a TFT. Therefore, no additional process is required for manufacturing the gate metal wiring 120a. In exemplary embodiments, an insulation layer (not shown) may be formed between the gate metal wiring 120a and the data metal wiring 110a of the OLB pad section 100a. In an exemplary embodiment, the insulation layer may include SiNx. An ITO layer (not shown) or an IZO layer (not shown) may be formed on the insulation layer. A portion of the ITO layer or the IZO layer may be removed in the OLB pad section 100a via a patterning process, such that the gate metal wiring 120a may be exposed. More specifically, the gate metal wiring 120a may be formed to be exposed through patterning the insulation layer via a photolithography process using a photoresist film. Therefore, a driving signal generated by the driver circuit may be applied to the gate metal wiring 120a through the exposed portion of the gate metal wiring 120a.

When the ITO layer or the IZO layer is formed, the ITO layer or the IZO layer may make contact with the exposed portion of the gate metal wiring 120a, such that the driving signal generated by the driver circuit is applied to the gate metal wiring 120a. Therefore, even if the data metal wiring 110a is electrically opened, the driving signal generated by the driver circuit may still be applied to the data metal wiring 210a of the fan-out section 200a through the gate metal wiring 120a, since the gate metal wiring 120a is electrically connected to the data metal wiring 210a of the fan-out section 200a.

When the gate metal wiring 120a is formed on a substrate, the insulation layer (not shown) is formed on the substrate including the gate metal wiring 120a formed thereon. Then, the data metal wiring 110a is formed on the insulation layer. The gate metal wiring 120a and the data metal wiring 110a are spatially and electrically separated without the ITO layer or the IZO layer disposed therebetween. However, the ITO layer or the IZO layer disposed therebetween electrically connects the gate metal wiring 120a and the data metal wiring 110a, such that the electrical signal may be transferred between the gate metal wiring 120a and the data metal wiring 110a.

Figure 9:
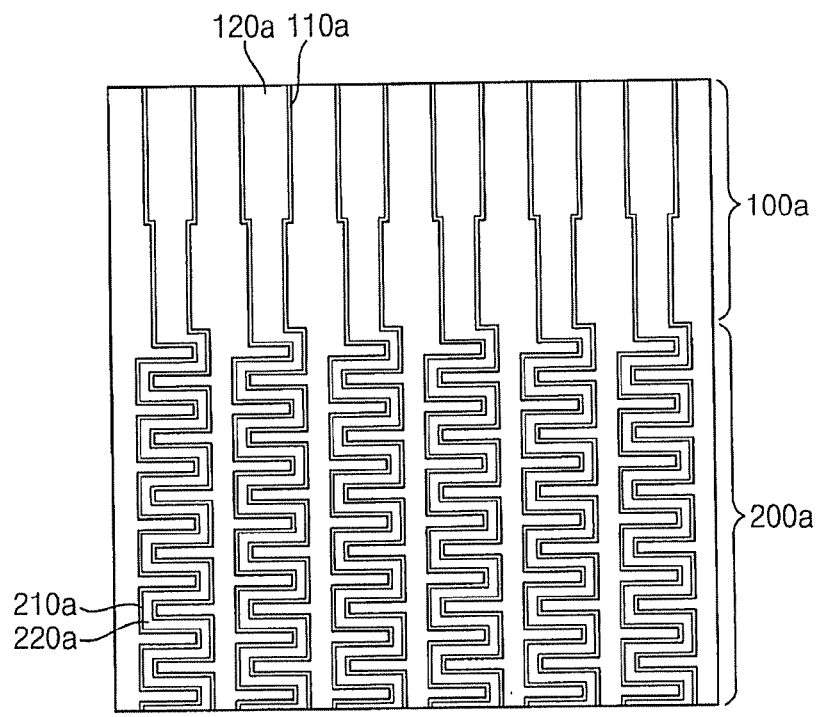
FIG. 9 is an enlarged partial layout view illustrating exemplary wirings in a border area of the OLB pad section and the fan-out section in FIG. 8.
Figure 10:
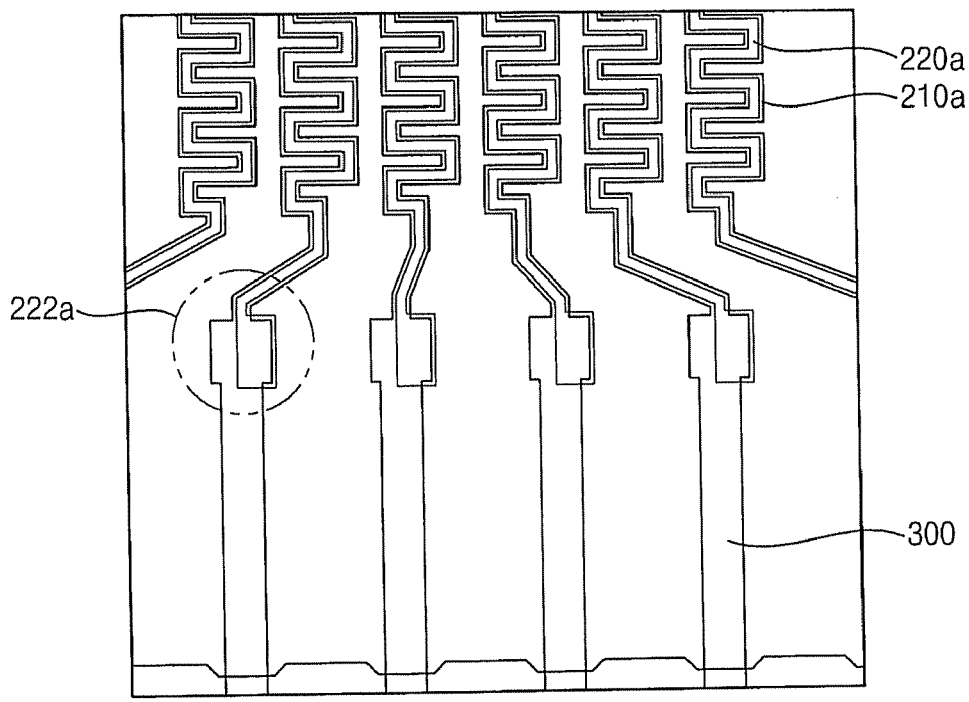
FIG. 10 is an enlarged partial layout view illustrating the exemplary wirings in a border area of the fan-out section in FIG. 8 and a display area.

FIG. 9 is an enlarged partial layout view illustrating exemplary wirings in a border area of the OLB pad section 110a and the fan-out section 200a in FIG. 8, and FIG. 10 is an enlarged partial layout view illustrating the exemplary wirings in a border area of the fan-out section in FIG. 8 and a display area.

Referring to FIGS. 8 to 10, the gate metal wiring 220a is formed under the data metal wiring 210a such that the gate metal wiring 220a overlaps with the data metal wiring 210a. The gate metal wiring 220a may be formed through a process of manufacturing a gate line 400 for a TFT. Therefore, no additional process is required for manufacturing the gate metal wiring 220a. In exemplary embodiments, an insulation layer (not shown) may be formed between the gate metal wiring 220a and the data metal wiring 210a. In an exemplary embodiment, the insulation layer may include SiNx. The gate metal wiring 220a is not electrically connected to a data line 300 of the display area at a border area of the fan-out section 200a and the display area.

Therefore, when the data metal wiring 210a is not electrically opened, the driving signal may be transferred from the driver circuit to the data line 300 of the display area through the OLB pad section 100a and the data metal wiring 210a. Therefore, the gate metal wiring 220a is unused. However, if the data metal wiring 210a is electrically opened, then the driving signal is not transferred to the data line 300 of the display area. In an exemplary embodiment, in order to solve the above problem, the gate metal wiring 220a may be electrically connected to the data line 300 of the display area through, for example, a melting process using a laser. In other words, the gate metal wiring 220a and the data line 300 may be electrically connected to each other by electrically shorting the gate metal wiring 220a and the data line 300 of the display area. When the gate metal wiring 220a and the data line 300 are electrically connected to each other, the driving signal generated by the driver circuit may be transferred to the data line 300 through the OLB pad section 100a and the gate metal wiring 220a. Therefore, even if the data metal wiring 210a is electrically opened, a repairing process may be performed.

The data metal wiring 210a and the gate metal wiring 220a in the fan-out section 200a may be spread apart from an adjacent data metal wiring 210a and gate metal wiring 220a to be electrically connected to data lines 300 in the display area. Therefore, a length of the data metal wiring 210a and the gate metal wiring 220a, respectively, may be different from an adjacent data metal wiring 210a and gate metal wiring 220a. As a result, a resistance difference for the different lengths may be generated which induces a signal delay. In order to solve the above problem, the data metal wiring 210a and the gate metal wiring 220a may include a serpentine-shape to reduce the difference in resistance due to the different lengths of wiring. In alternative exemplary embodiments, a width of the data metal wirings 210a and the gate metal wirings 220a may be adjusted such that the width of the data metal wirings 210a and the gate metal wirings 220a increases when a distance between a center of the fan-out section pad section 200a and a position of the data metal wirings 210a and the gate metal wirings 220a increases in order to reduce the resistance difference respectively between the data metal wirings 210a and the gate metal wirings 220a.

Hereinafter, a third exemplary embodiment will be described with reference to the figures.

Figure 11:
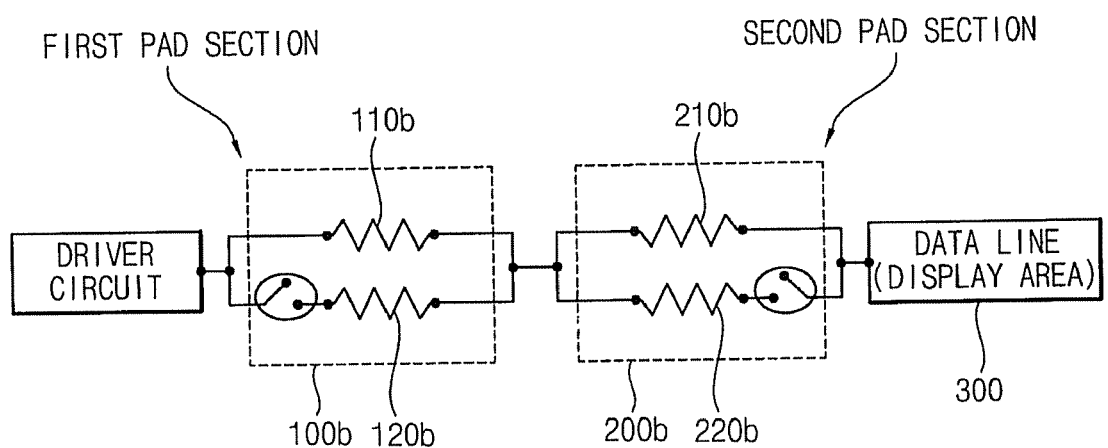
FIG. 11 is a schematic diagram illustrating an exemplary OLB pad section and wirings of a fan-out section according to a third exemplary embodiment of the present invention.
Figure 12A:
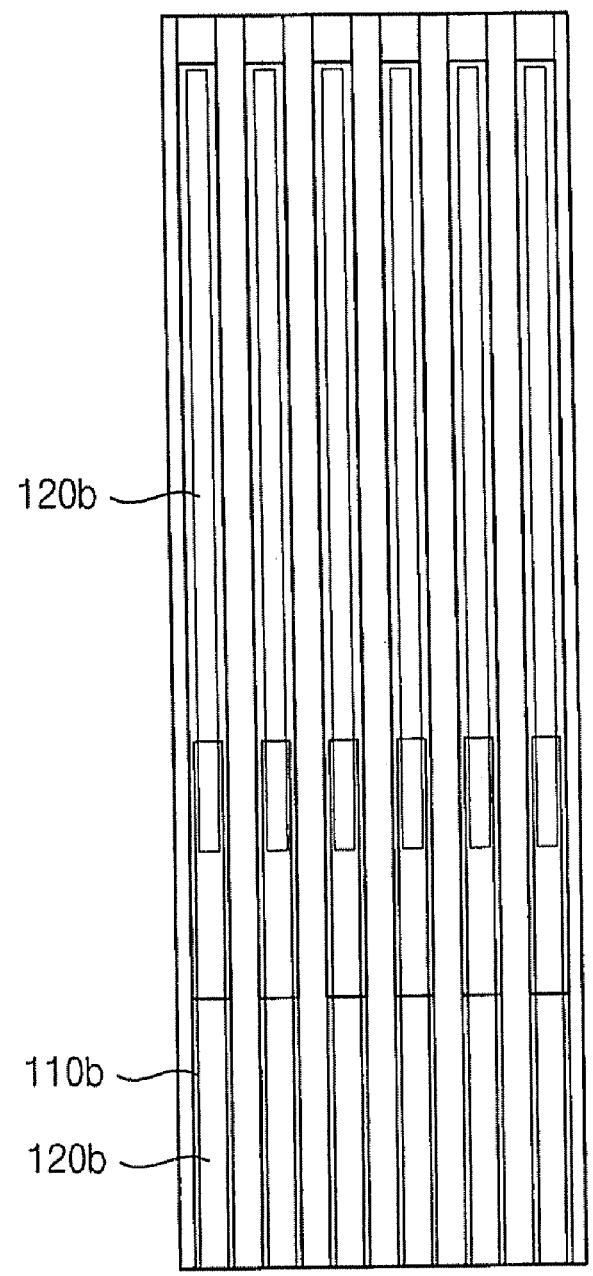
FIG. 12A is a top plan view illustrating the exemplary OLB pad section in FIG. 11.

FIG. 11 is a schematic diagram illustrating an exemplary OLB pad section and wirings of a fan-out section according to a third exemplary embodiment of the present invention. FIG. 12A is a top plan view illustrating the exemplary OLB pad section in FIG. 11, and FIG. 12B is a cross-sectional view illustrating the exemplary OLB pad section along a line defining a longitudinal axis of the OLB pad section in FIG. 12A.

Figure 12B:
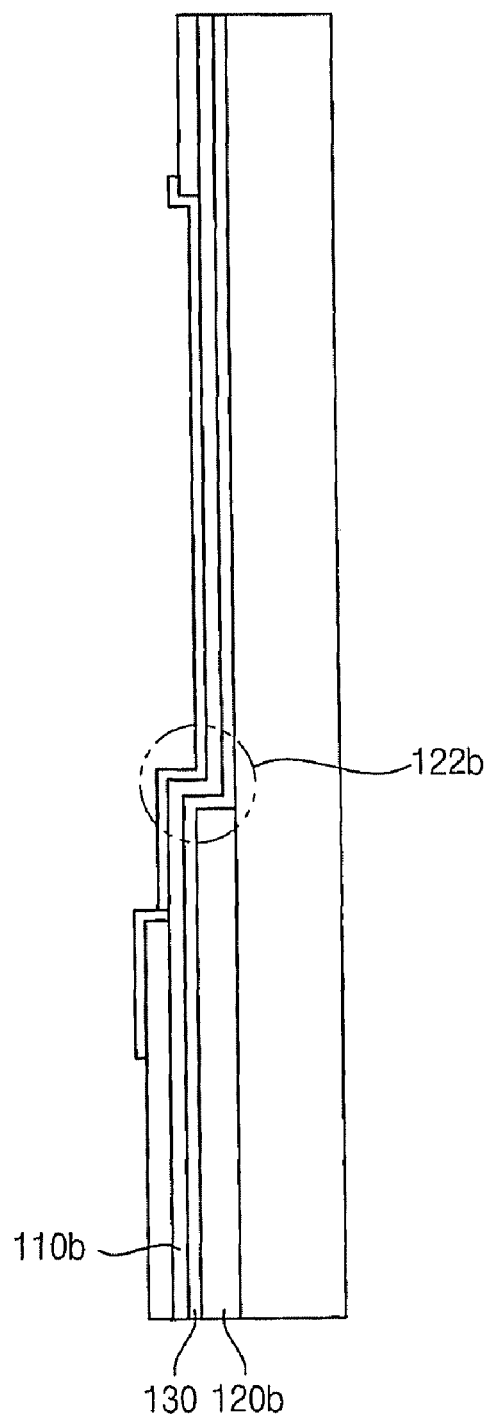
FIG. 12B is a cross-sectional view illustrating the exemplary OLB pad section in FIG. 12A.

Referring to FIGS. 11, 12A and 12B, the first pad section corresponds to the OLB pad section 100b, and the second pad section corresponds to fan-out section 200b. Under a layer on which a data metal wiring 110b of the OLB pad section 100b is formed, a gate metal wiring 120b is formed to overlap with the data metal wiring 110b. The gate metal wiring 120b of the OLB pad section 100b may be formed through a process of manufacturing a gate line 400 for a TFT. Therefore, no additional process is required for manufacturing the gate metal wiring 120b.

In an exemplary embodiment, an insulation layer 130 may be formed between gate metal wiring 120b and the data metal wiring 110b of the OLB pad section 100b. The gate metal wiring 120a of the OLB pad section 100b is electrically opened. The gate metal wiring 120b is spatially and electrically separated from the data metal wiring 110b by the insulation layer 130. Therefore, when the data metal wiring 110b of the OLB pad section 100b is not electrically opened, the gate metal wiring 120b is unused.

When the data metal wiring 110b is electrically opened, the driving signal of the driver circuit is not transferred to the data line 300 in the display area. Then, the gate metal wiring 120b may be electrically connected to the data metal wiring 110b by repairing. More specifically, in an exemplary embodiment, when the gate metal wiring 120b is electrically connected to the data metal wiring 110b at a connecting region 122b by, for example, a laser apparatus, the OLB pad section 100b may be electrically connected to the driver circuit. When the gate metal wiring 120b and the data metal wiring 110b are electrically connected to each other, the driving signal generated by the driver circuit may be applied to the data line 300 in the display area through the OLB pad section 100b and the fan-out section 200b.

Figure 13:
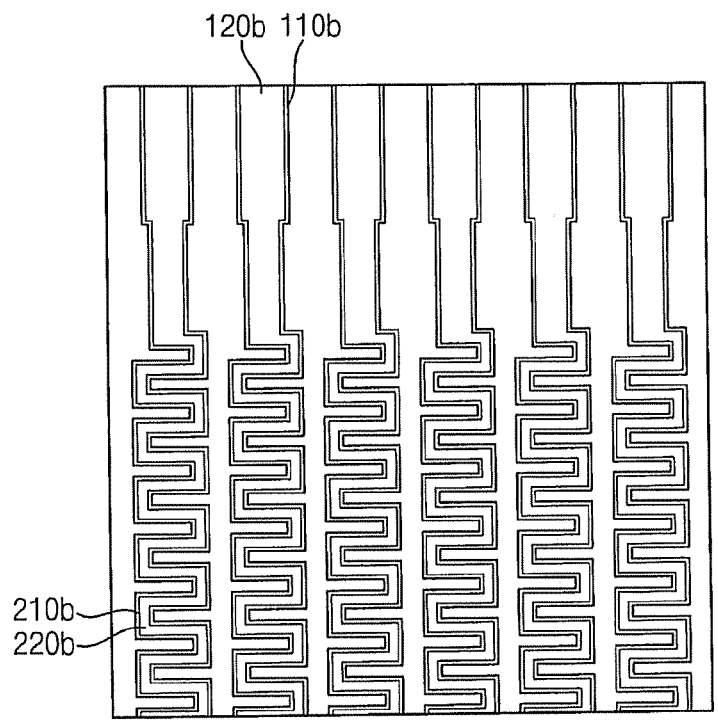
FIG. 13 is an enlarged partial layout view illustrating exemplary wirings in a border area of the OLB pad section and the fan-out section in FIG. 11.
Figure 14:
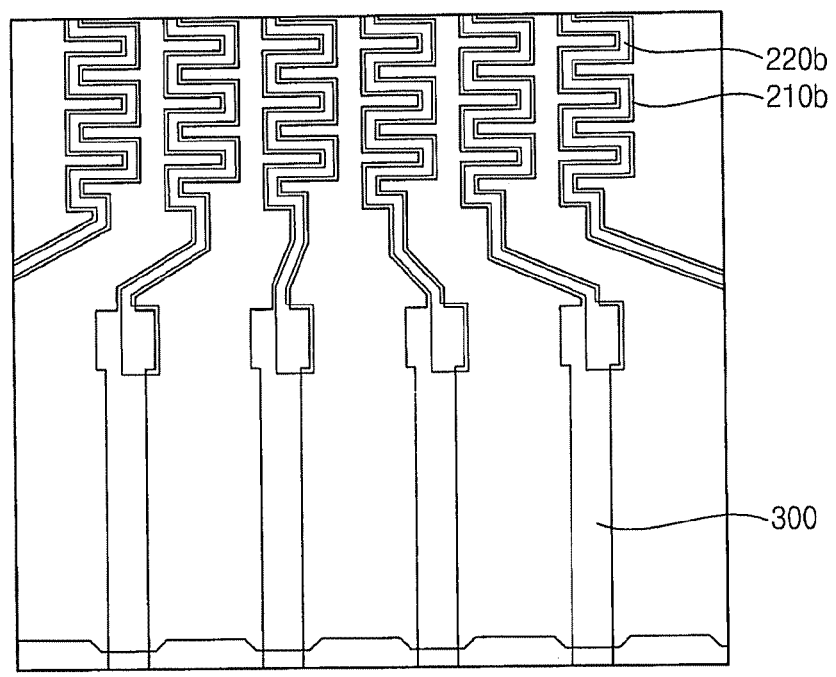
FIG. 14 is an enlarged partial layout view illustrating the exemplary wirings in a border area of the fan-out section in FIG. 11 and a display area.

FIG. 13 is an enlarged partial layout view illustrating exemplary wirings in a border area of the OLB pad section and the fan-out section in FIG. 11, and FIG. 14 is a layout illustrating the exemplary wirings in a border area of the fan-out section in FIG. 11 and a display area.

Referring to FIGS. 11, 13 and 14, the gate metal wiring 220b is formed under the data metal wiring 210b such that the gate metal wiring 220b overlaps with the data metal wiring 210b. The gate metal wiring 220b may be formed through a process of manufacturing a gate line 400 for a TFT. Therefore, no additional process is required for manufacturing the gate metal wiring 220b. An insulation layer (not shown) may be formed between gate metal wiring 220b and the data metal wiring 210b. The insulation layer may include SiNx. The gate metal wiring 220a is not electrically connected to a data line 300 of the display area at a border area of the fan-out section 200b and the display area.

Therefore, when the data metal wiring 210b is not electrically opened, the driving signal may be transferred from the driver circuit to the data line 300 of the display area through the OLB pad section 100b and the data metal wiring 210b. Therefore, the gate metal wiring 220b is unused. However, when the data metal wiring 210b is electrically opened, the driving signal is not transferred to the data line 300 of the display area. In order to solve the above problem, in an exemplary embodiment, the gate metal wiring 220b may be electrically connected to the data line 300 of the display area through, for example, a melting process using a laser apparatus. In other words, by electrically shorting the gate metal wiring 220b and the data line 300 of the display area, the gate metal wiring 220b and the data line 300 may be electrically connected to each other. When the gate metal wiring 220b and the data line 300 are electrically connected to each other, the driving signal generated by the driver circuit may be transferred to the data line 300 through the OLB pad section 100b and the gate metal wiring 220b. Therefore, even when the data metal wiring 210b is electrically opened, repairing a connection is possible.

The data metal wiring 210b and the gate metal wiring 220b in the fan-out section 200a may be spread-out to be electrically connected to data lines 300 in the display area. As a result, a resistance difference may be generated to induce a signal delay. In order to solve the above problem, exemplary embodiments of the data metal wiring 210b and the gate metal wiring 220b may include a serpentine-shape to reduce the resistance difference. In alternative exemplary embodiments, a width of the data metal wiring 210b and the gate metal wiring 220b may be adjusted to reduce the resistance difference.

Therefore, when the data metal wiring 210b is not electrically opened, the driving signal may be transferred from the driver circuit to the data line 300 of the display area through the OLB pad section 100b and the data metal wiring 210b.

Therefore, the gate metal wiring 220b is unused. However, when the data metal wiring 210b is electrically opened, the driving signal is not transferred to the data line of the display area. In an exemplary embodiment, in order to solve the above problem, the gate metal wiring 220b may be electrically connected to the data line 300 of the display area through, for example, a laser apparatus. In other words, by electrically shorting the gate metal wiring 220b and the data line 300 of the display area, the gate metal wiring 220b and the data line 300 may be electrically connected to each other. When the gate metal wiring 220b and the data line 300 are electrically connected to each other, the driving signal generated by the driver circuit may be transferred to the data line 300 through the OLB pad section 100b and the gate metal wiring 220b. Therefore, even when the data metal wiring 210b is electrically opened, repairing a connection is possible.

The data metal wiring 210b and the gate metal wiring 220b in the fan-out section 200b may be spread-out to be electrically connected to data lines 300 in the display area. As a result, a resistance difference may be generated which induces a signal delay. In order to solve the above problem, the data metal wiring 210b and the gate metal wiring 220b may include a serpentine-shape to reduce the resistance difference. In alternative exemplary embodiments, a width of the data metal wirings 210b and the gate metal wirings 220b may be adjusted such that the width of the data metal wirings 210b and the gate metal wirings 220b increases when a distance between a center of the fan-out section pad section 200b and a position of the data metal wirings 210b and the gate metal wirings 220b increases to reduce the resistance difference, respectively, between the data metal wirings 210b and the gate metal wirings 220b.

In FIGS. 1 to 14, the wiring structure is applied to a source driver integrated circuit ("IC"). In alternative exemplary embodiments, the OLB pad section and the fan-out section may be applied to a gate driver IC such that wirings of the gate driver IC may be repaired using an auxiliary wiring.

According to the present invention, the OLB pad section corresponding to the first pad section, and the fan-out section corresponding to the second pad section include not only conventional wirings but also additional wirings, such that even when one of the conventional wirings are electrically opened, the defects may be recovered by the additional wirings. Thus, yield of the TFT substrate may be increased.

Although some exemplary embodiments of the present invention and its advantages have been described, it is understood that the present invention should not be limited to these exemplary embodiments but various changes, substitutions and alterations can be made by one of ordinary skill in the art without departing from the spirit and scope of the invention as defined by appended claims.

What is claimed is:

1. A thin film transistor substrate comprising:
a substrate having a display area and a peripheral area adjacent to the display area;
a first pad section formed in the peripheral area, the first pad section including a first line and a second line, the first pad section receives a driving signal through at least one of the first and second lines;
a second pad section including a third line electrically connected to one of an end portion of the first line and second line and a fourth line electrically connected to one of an end portion of the first line and second line, the second pad section receives the driving signal through the first pad section to at least one of the third and fourth lines;
a signal wiring formed in the display area, the signal wiring electrically connected to at least one of the third and fourth lines of the second pad section; and
a pixel array formed in the display area, the pixel array receives the driving signal from the signal wiring,
wherein the first and second pad sections comprise:
a first metal pattern is formed on the substrate to form the first and third lines,
an insulation layer is disposed on the first metal pattern, and
a second metal pattern is formed on the insulation layer to form the second and fourth lines,
wherein the first and second receives the driving signal through the first line to repair a path through the second line when the second line is electrically opened,
and wherein the second pad section receives the driving signal through the third line to repair a path through the fourth line when the fourth line is electrically opened.

2. The thin film transistor substrate of claim 1, wherein the first and second pad sections further comprise:
a conductive pattern is disposed on the insulation layer having the second metal pattern formed thereon.

3. The thin film transistor substrate of claim 2, wherein the conductive pattern is transparent.

4. The thin film transistor substrate of claim 1, wherein the first and second lines overlap with each other, and the third and fourth lines overlap with each other.

5. The thin film transistor substrate of claim 4, wherein the third and fourth lines have a serpentine shape.

6. The thin film transistor substrate of claim 1, wherein the signal wirings comprise a plurality of gate lines and a plurality of data lines, the first and third lines comprise a same material as the gate lines, and the second and fourth lines comprise a same material as the data lines.

7. The thin film transistor substrate of claim 1, wherein the third line, the fourth line and the signal wiring are electrically connected to one another at an end portion of the second pad section.

8. The thin film transistor substrate of claim 1, wherein the third and fourth lines are electrically disconnected from each other at an end portion of the second pad section, such that the third line is electrically connected to the signal wiring, when the fourth line is electrically opened.

9. The thin film transistor substrate of claim 8, wherein the first and second lines are electrically disconnected from each other at an end. portion of the first pad section, such that the first line and the fourth line are electrically connected to each other, when the second line is electrically opened.

10. The thin film transistor substrate of claim 2,
wherein the insulation layer has a first hole exposing a portion of the first metal pattern,
and wherein the conductive pattern makes contact with the first metal pattern through the first hole.

11. The thin film transistor substrate of claim 10,
wherein the conductive pattern electrically connects the first metal pattern and the second metal pattern.

12. A liquid crystal display apparatus comprising:
a thin film transistor substrate comprising:
a substrate having a display area and a peripheral area substantially surrounding the display area;
a first pad section formed in the peripheral area, the first pad section including a first line and a second line, the first pad section receives a driving signal through at least one of the first and second lines;
a second pad section including a third line electrically connected to one of an end portion of the first line and the second line and fourth line electrically connected to one of an end portion of the first line and the second line, the second pad section receives the driving signal through the first pad section to at least one of the third and fourth lines;

signal wirings formed in the display area, the signal wirings electrically connected to at least one of the third and fourth lines of the second pad section; and a pixel array formed in the display area, the pixel array receives the driving signal from the signal wirings;

an opposite substrate combined with the thin film transistor substrate such that the opposite substrate faces the thin film transistor substrate; and a driver circuit which provides the first pad section of the thin film transistor substrate with the driving signal, wherein the first and second pad sections comprise:

a first metal pattern is formed on the substrate to form the first and third lines, an insulation layer is disposed on the first metal pattern, and a second metal pattern is formed on the insulation layer to form the second and wherein the first pad section receives the driving signal through the first line to repair a path through the second line when the second line is electrically opened, and wherein the second pad section receives the driving signal through the third line to repair a path through the fourth fine when the fourth line is electrically opened.

13. The liquid crystal display apparatus of claim 12, wherein the first and second pad sections further comprises:

a conductive pattern disposed on the insulation layer having the second metal pattern disposed thereon.

14. The liquid crystal display apparatus of claim 13, wherein the conductive pattern is transparent.

15. The liquid crystal display apparatus of claim 12, wherein the first and second lines overlap with each other, and the third and fourth lines overlap with each other, and the third and fourth lines have a serpentine shape.

16. The liquid crystal display apparatus of claim 12, wherein the signal wirings comprise a plurality of gate lines and a plurality of data lines, the first and third lines comprise a same material as that of the gate lines, and the second and fourth lines comprise a same material as that of the data lines.

17. The liquid crystal display apparatus of claim 12, wherein the third line, the fourth line and the signal wiring are electrically connected to one another at an end portion of the second pad section.

18. The liquid crystal display apparatus of claim 12, wherein the third and fourth lines are electrically disconnected from each other at an end portion of the second pad section, such that the third line is electrically connected to the signal wiring, when the fourth line is electrically opened.

19. The liquid crystal display apparatus of claim 18, wherein the first and second lines are electrically disconnected from each other at an end portion of the first pad section, such that the first line and the fourth line are electrically connected to each other, when the second line is electrically opened.

20. The liquid crystal display apparatus of claim 12, wherein a width of the third and fourth lines increases when a distance between a center of the second pad section and a position of the first and fourth lines increases to reduce resistance difference respectively between the third lines and the fourth lines.

21. The thin film transistor substrate of claim 13,
wherein the insulation layer has a first hole exposing a portion of the first metal pattern,
and wherein the conductive pattern makes contact with the first metal pattern through the first hole.

22. The thin film transistor substrate of claim 21,
wherein the conductive pattern electrically connects the first metal pattern and the second metal pattern.

23. A method of repairing a thin film transistor substrate, the thin film transistor substrate comprising a substrate having a display area and a peripheral area substantially surrounding the display area, a first pad section disposed in the peripheral area, the first pad section including a first line and a second line, the first pad section receives a driving signal through at least one of the first and second lines to repair the at least one of the first and second lines when at least one of the first and second lines is electrically open, a second pad section including a third line electrically connected to an end portion of the first line and a fourth line electrically connected to an end portion of the second line, the second pad section receives the driving signal through at least one of the third and fourth lines to repair the at least one of the third and fourth lines when at least one of the third and fourth lines is electrically open, a signal wiring disposed in the display area, the signal wiring electrically connected to at least one of the third and fourth lines of the second pad section and a pixel array disposed in the display area, the pixel array receives the driving signal from the signal wiring, the method comprising:

electrically connecting at least one of the third line, the fourth line and the signal wiring to one another at an end portion, and the first line of the first pad section to the second line of the first pad section to one another at an end portion, wherein the first and second pad sections comprise:

a first metal pattern is formed on the substrate to form the first and third lines, an insulation layer is disposed on the first metal pattern, and a second metal pattern is formed on the insulation layer to form the second and fourth lines.

24. The method claim of 23, wherein the electrically connecting at least one of the third line, the fourth line and the signal wiring to one another at an end portion, and the first line of the first pad section to the second line of the first pad section to one another at an end portion includes a melting process.

* * * * *